United States Patent
Kurokawa

(10) Patent No.: US 8,372,501 B2
(45) Date of Patent: Feb. 12, 2013

(54) OPTICAL INFORMATION RECORDING MEDIUM

(75) Inventor: Kotaro Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 12/692,153

(22) Filed: Jan. 22, 2010

(65) Prior Publication Data

US 2010/0209653 A1 Aug. 19, 2010

(30) Foreign Application Priority Data

Feb. 17, 2009 (JP) ................. 2009-034245

(51) Int. Cl.
*B32B 3/02* (2006.01)

(52) U.S. Cl. ............ 428/64.1; 428/64.4; 428/64.5; 428/64.6; 430/270.13

(58) Field of Classification Search ......... 428/64.4; 430/270.13
See application file for complete search history.

(56) References Cited

U.S. PATENT DOCUMENTS

| | | | |
|---|---|---|---|
| 6,821,707 B2 | 11/2004 | Uno et al. | |
| 7,709,073 B2 * | 5/2010 | Kojima et al. | 428/64.1 |
| 2005/0019695 A1 * | 1/2005 | Kojima et al. | 430/270.13 |

FOREIGN PATENT DOCUMENTS

| | | |
|---|---|---|
| JP | 11-213446 | 8/1999 |
| JP | 2001-344817 | 12/2001 |
| JP | 2004-273040 | 9/2004 |
| JP | 2005-190642 | 7/2005 |
| WO | WO 2007/013276 A1 | 2/2007 |

OTHER PUBLICATIONS

Office Action issued Nov. 9, 2010, in Japanese Patent Application No. 2009-034245.

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

An optical information recording medium includes: a supporting substrate; a light-transmitting protective layer which becomes a layer on the incident side of recording and reproducing laser light; and an information recording layer intervening between the supporting substrate and the light-transmitting protective layer, wherein the information recording layer includes a phase-change material layer, a dielectric layer and a metal layer in this order from the incident side of laser light; and the dielectric layer is constituted of, as a main component, $(In_2O_3)_x(SnO_2)_{1-x}$, wherein x is satisfied with the relationship of $(0.4 < x \leq 0.7)$.

8 Claims, 4 Drawing Sheets

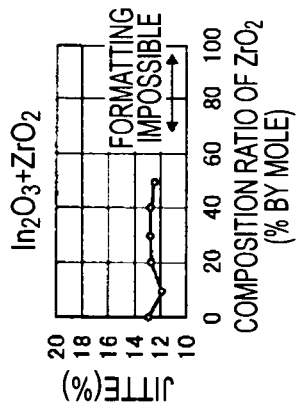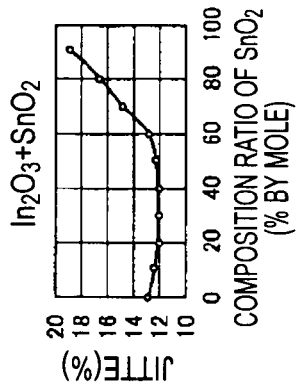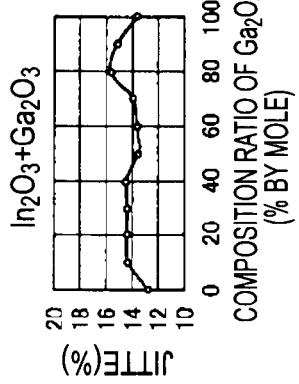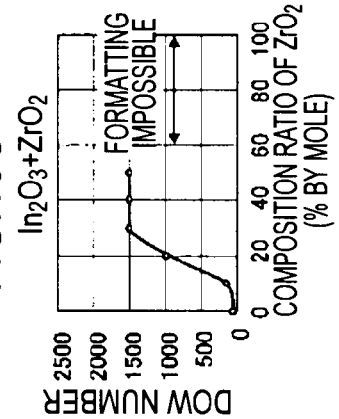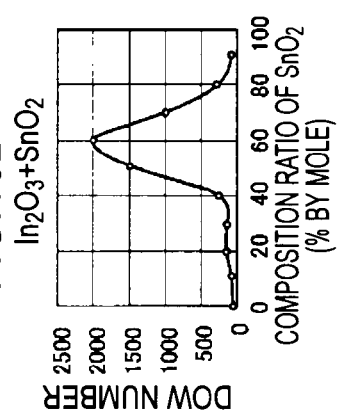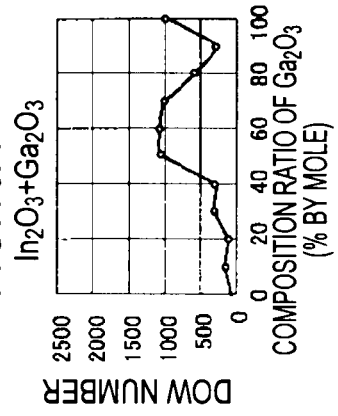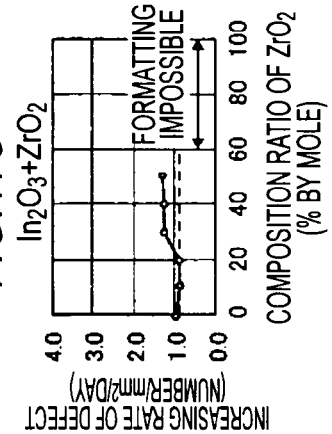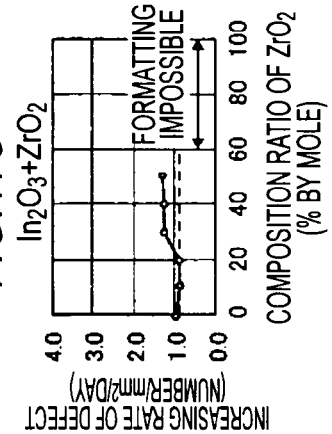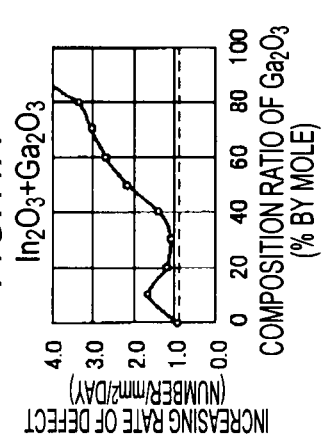

OPTICAL INFORMATION RECORDING MEDIUM

BACKGROUND OF THE INVENTION

1. Field of the Invention

The present invention relates to an optical information recording medium in which the state of a recording layer is changed upon irradiation with light, and a change thereof is read as a change in an optical response, thereby achieving recording, erase and reading of information.

2. Description of the Related Art

As one of memory media capable of recording, reproducing and erasing information upon irradiation with laser light, there is known a so-called phase-change type optical information recording medium utilizing transition between a crystal and an amorphous substance or transition between two crystal phases of a crystal 1 and a crystal 2. As this optical information recording medium, for example, CD-RW (Compact Disc-Rewritable), DVD-RW (Digital Versatile Disc-Rewritable), DVD-RAM (Digital Versatile Disc-Random Access Memory) and the like are commercialized.

As a recording layer material which is used in a phase-change recording system, a recording material containing, as a main component, GeSbTe, AgInSbTe, etc. is widely known and put into practical use as a rewritable optical information recording medium.

Also, in recent years, there have been commodified a high-density optical information recording medium which is corresponding to a blue laser wavelength represented by a Blu-ray disc (a registered trademark) and a disc drive apparatus corresponding thereto. As to the high-density optical information recording medium such as Blu-ray disc, in a rewritable type (phase-change type) optical information recording medium, a double-layered disc is put into practical use.

The double-layered disc has a form in which a first information recording layer is formed on a supporting substrate made of a plastic such as a polycarbonate; a second information recording layer is formed on the first information recording layer via an interlayer which is transparent to the wavelength of recording and reproducing laser light; and a light-transmitting protective layer which is transparent to the recording and reproducing wavelength is formed on the second information recording layer.

Laser light which is used for the recording and reproduction is made incident through an object lens from the side of the light-transmitting protective layer. The laser light which has passed through the object lens is condensed into the information recording layer, and the information is recorded and reproduced.

As an example of basic configurations of the information recording layer, there is a configuration in which a metal layer, a transparent dielectric layer, a phase-change material layer, a transparent dielectric layer and a light-transmitting protective layer are disposed in this order from the side of a supporting substrate.

For the purpose of rewriting the information, it is necessary to increase a crystallization rate of the recording material. As a method for increasing the crystallization rate, for example, a crystallization accelerating effect is obtained by bringing a material with poor adhesion properties to a phase-change material into contact with a phase-change material layer (see, for example, JP-A-11-213446 and JP-A-2001-344817).

SUMMARY OF THE INVENTION

However, the phase-change type optical information recording medium achieves rewriting of the information utilizing physical properties of a material, such as low adhesion between the phase-change material layer and the dielectric layer coming into contact with the phase-change material layer. For that reason, the interface of the material coming into contact with the recording material is easy to cause separation.

Also, for the purpose of diffusing heat generated in the phase-change material layer at the time of recording, a metal layer made of an Ag alloy or the like is formed. Ge to be used for the phase-change recording layer and Ag to be used for the purpose of diffusing heat are a material which is easy to cause coagulation, respectively.

When the coagulation is caused, for example, a local volume change of Ag is generated, a stress is accumulated within the recording layer, and separation is generated in a portion of the interface of the phase-change material layer where adhesion is poor. There is caused a problem that a defect to be caused by the separation of the interface of the phase-change material layer grows due to a change with a lapse of time of the optical information recording medium.

Thus, it is desirable to provide an optical information recording medium capable of suppressing the growth of a defect to be caused due to a change with a lapse of time without sacrificing recording and reproducing signal characteristics.

According to an embodiment of the present invention, there is provided an optical information recording medium including a supporting substrate, a light-transmitting protective layer which becomes a layer on the incident side of recording and reproducing laser light and an information recording layer intervening between the supporting substrate and the light-transmitting protective layer. The information recording layer includes a phase-change material layer, a dielectric layer and a metal layer in this order from the incident side of laser light.

The dielectric layer is constituted of, as a main component, $(In_2O_3)_x(SnO_2)_{1-x}$ (wherein x is satisfied with the relationship of $(0.4 < x \leq 0.7)$) or $(In_2O_3)_x(ZrO_2)_{1-x}$ (wherein x is satisfied with the relationship of $(0.1 < x \leq 0.5)$).

In accordance with the optical information recording medium according to the embodiment of the present invention, when the dielectric layer which is provided between the phase-change material layer and the metal layer is made to have the foregoing composition, a defect to be caused due to separation between the phase-change material and the dielectric layer can be suppressed. Furthermore, a crystallization rate of the phase-change material layer can be increased. For that reason, an optical information recording medium having excellent characteristics in both of reliability and a signal characteristic can be provided.

According to another embodiment of the present invention, there is provided an optical information recording medium including a supporting substrate, a light-transmitting protective layer which becomes a layer on the incident side of recording and reproducing laser light and plural information recording layers intervening between the supporting substrate and the light-transmitting protective layer. In the information recording layers, the information recording layer on the incident side of laser light includes a phase-change material layer, a dielectric layer and a metal layer in this order from the incident side of laser light.

The dielectric layer is constituted of, as a main component, $(In_2O_3)_x(SnO_2)_{1-x}$ (wherein x is satisfied with the relationship of $(0.4 < x \leq 0.7)$) or $(In_2O_3)_x(ZrO_2)_{1-x}$ (wherein x is satisfied with the relationship of $(0.1 < x \leq 0.5)$).

In accordance with the optical information recording medium according to the embodiment of the present invention, when the dielectric layer is made to have the foregoing composition, in the information recording layer on the incident side of laser light where defect suppression is especially difficult, a defect to be caused due to separation between the phase-change material layer and the dielectric layer can be suppressed. Furthermore, a crystallization rate of the phase-change material layer can be increased. For that reason, an optical information recording medium having excellent characteristics in both of reliability and a signal characteristic can be provided.

According to the embodiments of the present invention, the optical information recording medium capable of suppressing the growth of a defect to be caused due to a change with a lapse of time can be provided without reducing signal quality.

BRIEF DESCRIPTION OF THE DRAWINGS

FIGS. 9A to 9C are each a graph showing the result of comparison in an RF signal jitter value of each of optical information recording media prepared in the working example.

FIGS. 10A to 10C are each a graph showing the result of comparison in a number of RF rewrites of each of optical information recording media prepared in the working example.

FIGS. 11A to 11C are each a graph showing the result of comparison in a reliability test of each of optical information recording media prepared in the working example.

DESCRIPTION OF THE PREFERRED EMBODIMENTS

Examples of best modes for carrying out embodiments according to the present invention are hereunder described, but it should not be construed that the present invention is limited to the following examples.

Embodiments according to the present invention are described in the following order.

1. Structure of optical information recording medium
2. Working example of optical information recording medium
(1. Structure of Optical Information Recording Medium)
[Entire Configuration Example of Optical Information Recording Medium]

Figure 1:
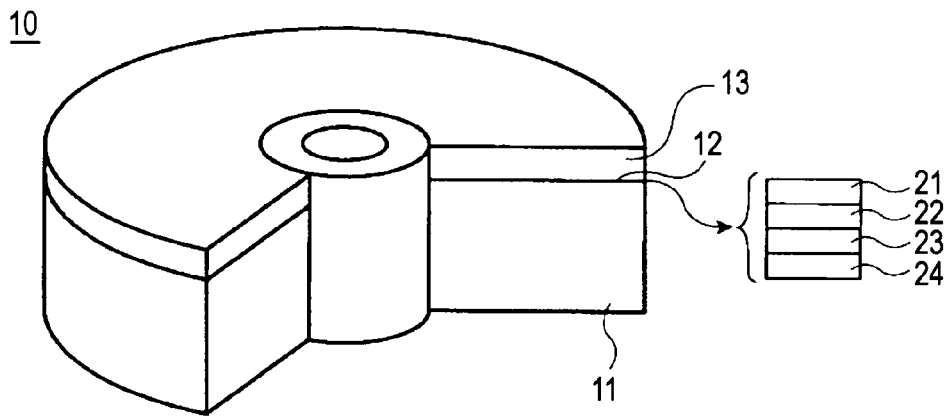
FIG. 1 is a view showing a diagrammatic configuration of an optical information recording medium according to an embodiment of the present invention.

FIG. 1 shows a diagrammatic configuration view of an optical information recording medium in which a recording layer is constituted of only one layer, as an example of a phase-change type optical information recording medium according to an embodiment of the present invention.

As shown in FIG. 1, an optical information recording medium 10 is configured to include a supporting substrate 11, an information recording layer 12 and a light-transmitting protective layer 13.

The supporting substrate 11 is constituted of a plastic material such as a polycarbonate or a glass or the like. The information recording layer 12 is formed on the supporting substrate 11. Also, a light-transmitting protective layer (cover layer) 13 which is transparent to the wavelength of recording and reproducing laser light is provided on the information recording layer 12. The light-transmitting protective layer 13 is constituted of, for example, an ultraviolet ray-curable resin or the like.

In the optical information recording medium 10 shown in FIG. 1, the laser light which is used for the recording and reproduction is made incident from the side of the light-transmitting protective layer 13.

Also, the laser light which is used for the recording and reproduction is emitted from a disc recording and reproducing apparatus. The laser light which has been made incident from the side of the light-transmitting protective layer 13 is condensed into the information recording layer 12 depending upon the focus control of the disc recording and reproducing apparatus, and the information is recorded and reproduced.

The information recording layer 12 is provided with a first dielectric layer 21, a phase-change material layer 22, a second dielectric layer 23 and a metal layer 24 from the incident side of laser light which is used for the recording and reproduction in the layer.

[Entire Configuration Example of Optical Information Recording Medium Provided with Plural Information Recording Layers]

Figure 2:
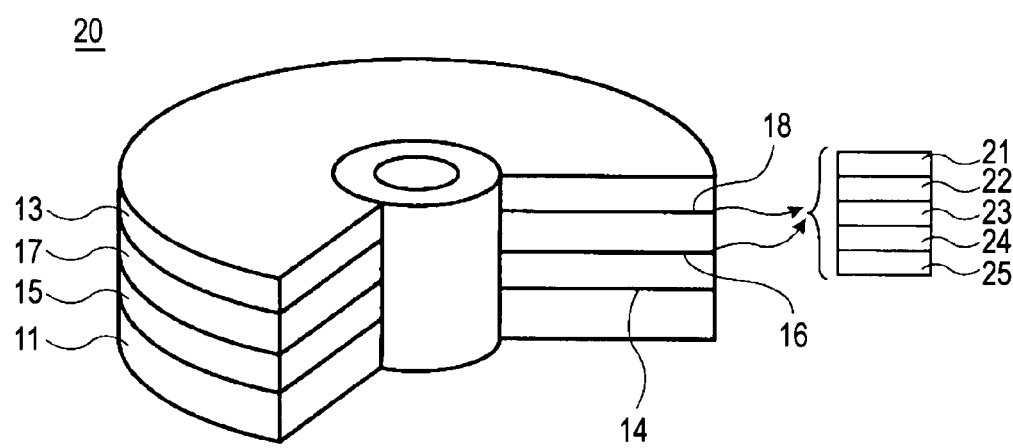
FIG. 2 is a view showing a diagrammatic configuration of an optical information recording medium according to an embodiment of the present invention.

Next, FIG. 2 shows a diagrammatic configuration view of an optical information recording medium in which an information recording layer is constituted of three layers, as an example of a phase-change type optical information recording medium according to an embodiment of the present invention. The same configurations as those in the optical information recording medium 10 shown in FIG. 1 are given the same symbols, and detailed descriptions thereof are omitted.

As shown in FIG. 2, an optical information recording medium 20 is configured to include a supporting substrate 11, a first interlayer 15, a second interlayer 17, a light-transmitting protective layer 13 and plural first to third information recording layers 14, 16 and 18.

The supporting substrate 11 is constituted of a plastic material such as a polycarbonate or a glass or the like. The first information recording layer 14 is formed on the supporting substrate 11. Also, the second information recording layer 16 is formed on the first information recording layer 14 via the first interlayer 15 which is transparent to the wavelength of recording and reproducing laser light. The second information recording layer 16 is a semi-transmitting recording layer which is formed on the incident side of laser light of the optical information recording medium 20 relative to the first information recording layer 14. Furthermore, the third information recording layer 18 is provided on the second information recording layer 16 via the second interlayer 17 which is transparent to the wavelength of recording and reproducing laser light. Similar to the second information recording layer 16, the third information recording layer 18 is a semi-transmitting recording layer which is formed on the incident side of laser light of the optical information recording medium 20 relative to the first information recording layer 14. The light-transmitting protective layer (cover layer) 13 which is transparent to the wavelength of recording and reproducing laser light is formed on the third information recording layer 18. The first interlayer 15, the second information recording layer 17 and the light-transmitting protective layer 13 are each constituted of, for example, an ultraviolet ray-curable resin or the like.

The laser light which is used for the recording and reproduction is emitted from a disc recording and reproducing apparatus. Also, the laser light which is used for the recording and reproduction is made incident from the side of the light-transmitting protective layer 13. The laser light which has been made incident from the side of the light-transmitting protective layer 13 is condensed into the first information recording layer 14, the second information recording layer 16 or the third information recording layer 18 depending upon the focus control of the disc recording and reproducing apparatus, and the information is recorded and reproduced.

Each of the first information recording layer 14, the second information recording layer 16 and the third information recording layer 18 is provided with a first dielectric layer 21, a phase-change material layer 22, a second dielectric layer 23, a metal layer 24 and a third dielectric layer 25 from the incident side of laser light which is used for the recording and reproduction in the layer.

[Configuration Example of Recording Layer of Optical Information Recording Medium]

Next, the configuration of each of the information recording layer 12 of the optical information recording medium 10 shown in FIG. 1 and the first to third information recording layers 14, 16 and 18 of the optical information recording medium 20 shown in FIG. 2 is described.

As described previously, in the information recording layer 12, the first dielectric layer 21, the phase-change material layer 22, the second dielectric layer 23 and the metal layer 24 are formed in this order from the incident side of laser light. Also, in each of the information recording layers 14, 16 and 18, the first dielectric layer 21, the phase-change material layer 22, the second dielectric layer 23, the metal layer 24 and the third dielectric layer 25 are formed in this order from the incident side of laser light.

Similar to the information recording layer 12, the information recording layer 18 may be configured to include the first dielectric layer 21, the phase-change material layer 22, the second dielectric layer 23 and the metal layer 24 in this order from the incident side of laser light without being provided with the third dielectric layer 25.

Each of the first dielectric layer 21 and the third dielectric layer 25 is formed of, for example, SiN, ZnS, $SiO_2$, $TiO_2$, $Nb_2O_5$ or the like.

The phase-change material layer 22 is formed of, for example, a phase-change recording material containing, as a main component, GeSbTe, AgInSbTe or the like. Also, various materials, for example, Ge—Sb—Te, Te—Sn—Ge, Te—Sb—Ge—Se, Te—Sn—Ge—Au, Ag—In—Sb—Te, In—Sb—Se, In—Te—Se or the like can be applied as the phase-change recording material.

The metal layer 24 is formed of, for example, an Ag alloy or the like.

[Configuration Example of Second Dielectric Layer in Recording Layer]

Next, in the recording layer, the configuration of the second dielectric layer 23 intervening between the phase-change material layer 22 and the metal layer 24 is described.

In particular, in an optical information recording medium having a multi-layered structure such as the optical information recording medium 20 shown in FIG. 2, defect suppression is especially difficult in the semi-transmitting recording layer on the incident side of laser light, such as the second information recording layer 16 or the third information recording layer 18. For that reason, in a multi-layered optical information recording medium provided with two or more recording material layers, a relation of a material composition of the second dielectric layer with characteristics of the optical information recording medium is described while paying attention to the second dielectric layer 23 which is the semi-transmitting recording layer on the incident side of laser light and referring to the second dielectric layer 23 as an example.

The information recording on each of the optical information recording media 10 and 20 is carried out on the phase-change recording material which constitutes the phase-change material layer 22.

In an unrecorded region of each of the optical information recording media 10 and 20, the phase-change recording material is converted into a crystalline state by a process called formatting. Then, when recording is carried out on each of the optical information recording media 10 and 20, laser light is condensed into each of the information recording layers 12, 14, 16 and 18 to heat melt the phase-change recording material, and furthermore, the molten phase-change recording material is quenched to form an amorphous region. In this way, by controlling the length of an amorphous mark obtained by making the phase-change recording material amorphous, the information is recorded on the optical information recording medium.

Also, in the case of newly overwriting information in a region where information has already been recorded, the phase-change recording material is melted or crystallized by heat generated during the overwriting just before the formation of a new amorphous mark, thereby erasing the existing amorphous mark. Then, a new amorphous mark is formed by quenching a portion which has been melted at that time.

Here, the second dielectric layer 23 coming into contact with the phase-change material layer 22 participates in the crystallization of the existing mark during the overwriting.

By disposing a material with weak adhesion to the phase-change recording material in the second dielectric layer 23, it becomes possible to make the recording material bear a larger amount of a crystal nucleus. For that reason, a speed of crystallizing the phase-change recording material, namely a so-called crystallization rate can be increased. However, because of poor adhesion of the second dielectric layer 23 to the phase-change recording material, the second dielectric layer 23 becomes an interface at which the separation takes place in an environmental test, thereby lowering reliability of the optical information recording medium. In consequence, it is necessary to dispose a material which is able to be satisfied with both of reliability and a signal characteristic of the optical information recording medium in the second dielectric layer 23.

Also, in forming an amorphous mark in the phase-change recording material, the molten phase-change recording material is required to be quenched. For that reason, the phase-change recording material is quenched by rapidly diffusing heat generated therein while utilizing a high-heat conductivity characteristic of an Ag alloy or the like which constitutes the metal layer 24. At that time, the second dielectric layer 23 which is present between the phase-change material layer 22 and the metal layer 24 plays a role to control this heat transfer.

Also, Ge in the phase-change recording material which is used in the phase-change material layer 22, such as GeSbTe and GeBiTe, and the Ag alloy which constitutes the metal layer 24 are easy to cause coagulation. In particular, Ag which constitutes the metal layer 24 is easily coagulated and is easily oxidized upon reacting with moisture in the substrate, thereby causing a change in volume. For that reason, the second dielectric layer 23 is required to have an information rewriting performance at the time of recording and an effect for suppressing the coagulation or corrosion of Ag.

In this way, the second dielectric layer 23 bears an important action in the information recording layer.

As described previously, it is necessary to apply a material which is able to be satisfied with both of reliability and a signal characteristic of the optical information recording medium in the second dielectric layer 23 which is provided between the phase-change material layer 22 and the metal layer 24. From this viewpoint, it is preferable that the material which is applied in the second dielectric layer 23 contains, as a main component, $(In_2O_3)_x(SnO_2)_{1-x}$ (wherein x is satisfied with the relationship of $(0.4<x\leqq0.7)$). Also, it is preferable that the material which is applied in the second dielectric layer 23 contains, as a main component, or $(In_2O_3)_x(ZrO_2)_{1-x}$ (wherein x is satisfied with the relationship of $(0.1<x\leqq0.5)$). The respective compositions are expressed in terms of a molar ratio (% by mole).

In view of the fact that the second dielectric layer 23 which is provided between the phase-change material layer 23 and the metal layer 24 contains $In_2O_3$, it is possible to form a recording layer having a low increasing rate of defect to be caused due to a change with a lapse of time and high reliability. However, when the second dielectric layer 23 is formed using only $In_2O_3$ as a main component, an RF (radio frequency) signal characteristic is low. Also, in view of an RF signal rewriting performance, namely a so-called DOW (direct over write) characteristic, there is a tendency that a DOW jitter increases at a stage where a number of rewrites (DOW number) is small. In consequence, in the case where the second dielectric layer 23 is formed using only $In_2O_3$ as a main component, the RF signal rewriting performance is insufficient. For that reason, by mixing a certain amount of $SnO_2$ or $ZrO_2$ in $In_2O_3$, it is possible to enhance the rewriting characteristic and the RF signal characteristic such as a DOW number due to the characteristics of $SnO_2$ or $ZrO_2$ while keeping the high reliability which $In_2O_3$ possesses. For that reason, it is preferable to apply a material containing, as a main component, $(In_2O_3)_x(SnO_2)_{1-x}$ (wherein x is satisfied with the relationship of $(0.4<x\leqq0.7)$) in the second dielectric layer 23. Also, it is preferable to apply a material containing, as a main component, $(In_2O_3)_x(ZrO_2)_{1-x}$ (wherein x is satisfied with the relationship of $(0.1<x\leqq0.5)$) in the second dielectric layer 23.

In the light of the above, by constituting the dielectric layer which is provided between the phase-change material layer and the metal layer using a material containing the foregoing composition as a main component, it is possible to provide an information recording medium capable of suppressing the growth of a defect to be caused due to a change with a lapse of time without sacrificing recording and reproducing signal characteristics.

EXAMPLES (2. Working Example of Optical Information Recording Medium)

An optical information recording medium was actually prepared, and a relation of a material of the dielectric layer to be provided between the phase-change material layer and the metal layer, with the reliability and signal characteristic of the optical information recording medium was examined.

Figure 3:
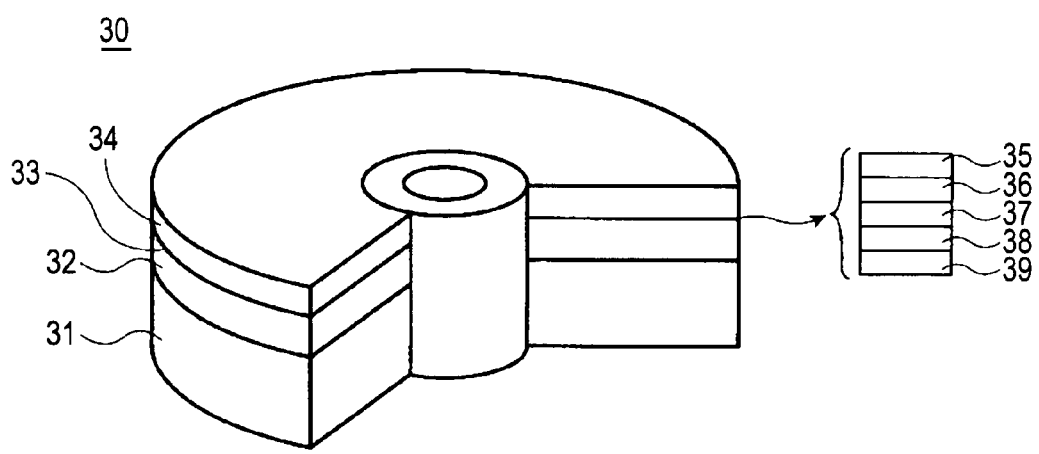
FIG. 3 is a view showing a diagrammatic configuration of each of optical information recording media prepared in the working example according to an embodiment of the present invention.

A structure of the optical information recording medium which was actually prepared in the present experiment is shown in FIG. 3.

As shown in FIG. 3, an optical information recording medium 30 has a laminated structure in which an information recording layer 33 is formed on a supporting substrate 31 via an interlayer 32, and a light-transmitting protective layer 34 is formed on the information recording layer 33.

Also, the information recording layer 33 has a configuration in which a first dielectric layer 35, a phase-change material layer 36, a second dielectric layer 37, a metal layer 38 and a third dielectric layer 39 are laminated from the side of laser light which is used for the recording and reproduction.

For the first dielectric layer 35, an SiN layer was formed in a thickness of 10 nm, and an $Nb_2O_5$ layer was laminated in a thickness of 24 nm thereon. Also, for the phase-change material layer 36, a pseudo binary material of a GeBiTe (GeTe—$Bi_2Te_3$) system was formed in a thickness of 6 nm. For the metal layer 38, an Ag alloy was formed in a thickness of 8 nm. For the third dielectric layer 39, $TiO_2$ was formed in a thickness of 21 nm. The supporting substrate 31 was formed of a 1.1 t-thick polycarbonate.

Figure 4:
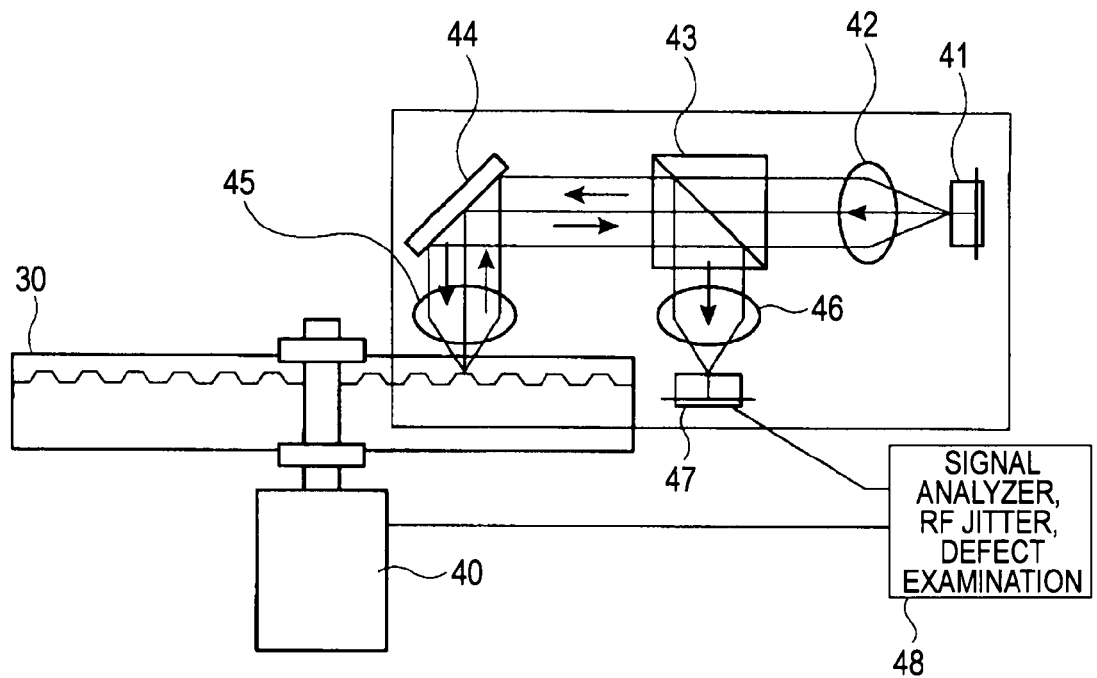
FIG. 4 is a view showing a diagrammatic configuration of a disc evaluation apparatus used in the working example.

Also, for the evaluation of the optical information recording medium 30, signal recording and reproduction were carried out using a disc evaluation apparatus shown in FIG. 4, thereby evaluating the signal quality or detecting a defect. This disc evaluation apparatus has the same specification as in a Blu-ray disc (a registered trademark) drive.

The disc evaluation apparatus shown in FIG. 4 is a recording and reproducing apparatus for carrying out recording and reproduction on the optical information recording medium 30 and includes a recording medium disposing section and a movable optical system.

The optical information recording medium 30 is disposed in the recording medium disposing section, and a spindle motor 40 for rotating and driving the optical information recording medium 30 is included therein.

The movable optical system includes a light source part 41 composed of, for example, a semiconductor laser, etc., a collimator lens 42, a beam splitter 43, a mirror 44, an object lens 45, a condensing lens 46 and a photodetector 47.

In the disc evaluation apparatus, by rotating the optical information recording medium 30 by the spindle motor 40 and moving the movable optical system in a radial direction of the optical information recording medium 30, laser light from the light source part 41 is scanned on the optical information recording medium 30. Also, the optical information recording medium 30 is disposed such that the side of the light-transmitting protective layer is faced upward, and the laser light is irradiated from the side of the light-transmitting protective layer.

Also, return light from the optical information recording medium 30 is branched by the beam splitter 43 and introduced into the photodetector 47. The return light is then detected by the photodetector 47. Furthermore, the evaluation of signal quality or detection of a defect is carried out by a signal analyzer 48 connected to the photodetector 47.

In the evaluation of signal quality of the optical information recording medium 30, the foregoing disc evaluation apparatus was used, and a jitter value expressing the quality of a recorded signal and an erase ratio expressing an information rewriting performance were taken as indexes.

In the detection of a defect, a track in an unrecorded part of the optical information recording medium 30 was entirely scanned while applying a tracking servo by drive, thereby observing the return light quantity of laser, and when the return light quality changed, a change thereof was detected as a defect.

[RF Signal Erase Characteristic]

In the layer configuration of the information recording layer 33, a material of the second dielectric layer 37 strongly influences both of the signal quality and an increasing rate of defect. Therefore, in the following experiment, the performance of the optical information recording medium 30 was compared while diversely changing the material of the second dielectric layer 37.

$Al_2O_3$, $Cr_2O_3$, $Ga_2O_3$, $In_2O_3$, $Nb_2O_5$, SiN, $SiO_2$, $Ta_2O_5$, ZnO, ZnS—, $ZrO_2$, ZnS, $CeO_2$ or $SnO_2$ was disposed in the second dielectric layer 37 of the optical information recording medium 30, and an RF signal erase characteristic was measured.

Figure 5:
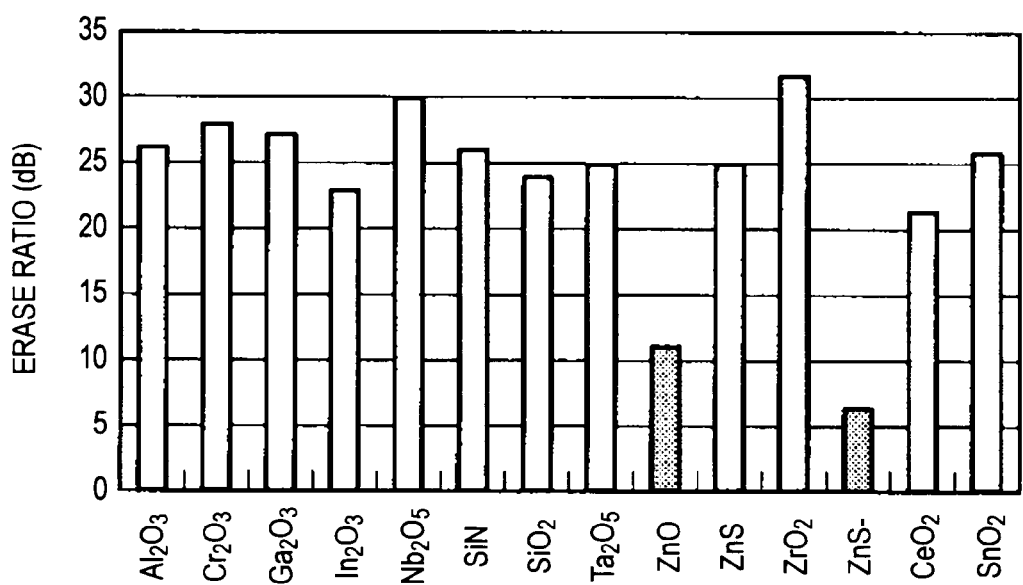
FIG. 5 is a graph showing the result of comparison in an RF (radio frequency) signal erase characteristic of each of optical information recording media prepared in the working example.

The measurement result of the RF signal erase characteristic of each of the optical information recording media 30 is shown in FIG. 5.

As to the RF signal erase characteristic, a signal having a length of 8T was recorded on the recording layer, and a signal having a length of 3T was rewritten from the top of the signal of 8T. A change of the signal amount of the signal of 8T was measured before and after rewriting with the signal of 3T.

As shown in FIG. 5, the optical information recording media 30 in which various materials other than ZnO and ZnS— were applied, respectively in the second dielectric layer 37 revealed good results in the RF signal erase characteristic. The optical information recording media 30 in which ZnO and ZnS— were applied, respectively in the second dielectric layer 37 were extremely low in an erase ratio, and good results were not obtained.

[Increasing Rate 1 of Defect by Reliability Test]

Next, similar to the foregoing RF signal erase characteristic, a reliability test of the optical information recording medium 30 in which $Al_2O_3$, $Cr_2O_3$, $Ga_2O_3$, $In_2O_3$, $Nb_2O_5$, SiN, $SiO_2$, $Ta_2O_5$, ZnO, ZnS, $ZrO_2$, ZnS—, $CeO_2$ or $SnO_2$ was applied in the second dielectric layer 37 was carried out.

In the reliability test, each of the prepared optical information recording media 30 was held in a nitrogen atmosphere at 90° C. for 24 hours, and a defect was then detected by the foregoing disc evaluation apparatus, thereby measuring an increasing rate of defect. The increasing rate of defect is expressed by a numerical value obtained by dividing an increasing number of defective areas per $mm^2$ in the optical information recording medium 30 before and after the reliability test by a time (day) of the reliability test.

Figure 6:
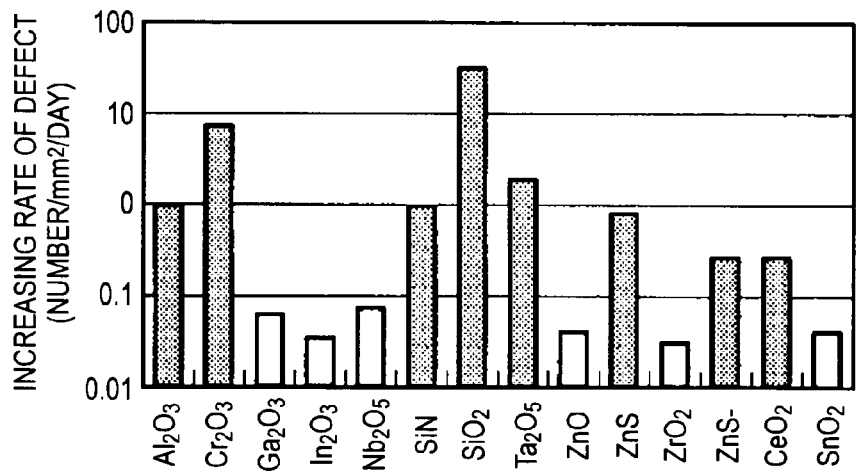
FIG. 6 is a graph showing the result of a reliability test of each of optical information recording media prepared in the working example.

The result of comparison in the increasing rate of defect of the reliability test of each of the optical information recording media 30 is shown in FIG. 6.

As shown in FIG. 6, the optical information recording media 30 in which $Ga_2O_3$, $In_2O_3$, $Nb_2O_5$, ZnO, $ZrO_2$ and $SnO_2$ were applied, respectively in the second dielectric layer 37 revealed good results in view of the increasing rate of defect. Of these, ZnO is extremely low in the erase ratio in the result of the RF signal erase characteristic shown in FIG. 5, and therefore, it is not preferable to apply ZnO in the dielectric layer of the optical information recording medium.

[Increasing Rate 2 of Defect by Reliability Test]

Next, $Ga_2O_3$, $In_2O_3$, $Nb_2O_5$, $ZrO_2$ and $SnO_2$, each of which is preferable in the result of the reliability test shown in FIG. 6 and relatively good in the result of the RF signal erase characteristic shown in FIG. 5, were applied, respectively in the second dielectric layer 37, thereby preparing the optical information recording media 30. A reliability test of each of the prepared optical information recording media 30 was carried out.

In the reliability test, each of the optical information recording media 30 was held in a thermo-hygrostat in an atmosphere at a temperature of 80° C. and a humidity of 85% for 100 hours, and the defect was then detected using the foregoing disc evaluation apparatus, thereby measuring an increasing rate of defect.

The increasing rate of defect is expressed by a numerical value obtained by dividing a number of defective areas per $mm^2$ in the optical information recording medium 30 by a time (day) of the reliability test.

Figure 7:
FIG. 7 is a graph showing the result of a reliability test of each of optical information recording media prepared in the working example.

The result of comparison in the increasing rate of defect of the reliability test of each of the optical information recording media 30 is shown in FIG. 7.

As shown in FIG. 7, in the optical information recording medium 30 in which $In_2O_3$ was applied in the second dielectric layer 37, the result in which the increasing rate of defect was remarkably low was obtained as compared with that in the optical information recording media 30 in which other materials than $In_2O_3$ were applied, respectively in the second dielectric layer 37. Also, it was understood that in the optical information recording medium 30 in which $Nb_2O_5$ was applied in the second dielectric layer 37, the increasing rate of defect was remarkably deteriorated as compared with that in the optical information recording media 30 in which $Ga_2O_3$, $In_2O_3$, $ZrO_2$ and $SnO_2$ were applied, respectively in the second dielectric layer 37.

Next, the optical information recording medium 30 in which $In_2O_3$ revealing a good result in the reliability test was applied in the second dielectric layer 37 was subjected to a test for the RF signal rewriting characteristic. The result of this test is shown in FIG. 8.

Figure 8:
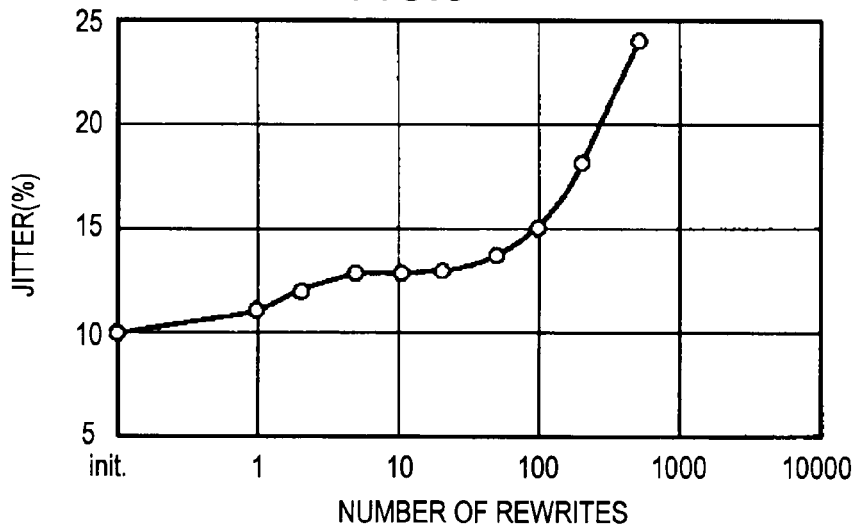
FIG. 8 is a graph showing an RF signal rewriting characteristic of each of optical information recording media prepared in the working example.

As shown in FIG. 8, in the case where $In_2O_3$ was applied in the second dielectric layer 37 of the optical information recording medium 30, the DOW jitter increased at the number of rewrites in the vicinity of 100. As a result, in the case where $In_2O_3$ was applied in the second dielectric layer 37, in the RF signal rewriting performance, namely a so-called DOW characteristic, there was a tendency that the DOW jitter increased while the number of rewrites was still small.

It is understood from the foregoing results that it is preferable to use $In_2O_3$ as a material which constitutes the second dielectric layer 37 in view of the increasing rate of defect in the reliability test. However, in the case where $In_2O_3$ was applied in the second dielectric layer 37, as shown in FIG. 5, the erase ratio was 22 dB, and this value revealed an insufficient result as the RF signal rewriting performance of an optical information recording medium. In general, it is considered that the erase ratio of an optical information recording medium is required to be 26 dB or more. Also, in the DOW characteristic, there was a tendency that the DOW jitter increased while the number of rewrites was still small.

In consequence, in the case where the second dielectric layer is constituted of a simple substance of $In_2O_3$, the resulting performance is insufficient as the performance of an optical information recording medium.

[Various Tests in the Case of Applying a Complex Oxide of $In_2O_3$ and Other Material]

Next, $Ga_2O_3$, $ZrO_2$ and $SnO_2$, each of which revealed a next good result of the reliability test shown in FIG. 6 after $In_2O_3$, were combined, respectively with $In_2O_3$ to form complex oxides; and each of the complex oxides was applied in the second dielectric layer 37, thereby evaluating the resulting optical information recording medium 30.

The optical information recording media 30 in which complex oxides formed by combining $Ga_2O_3$, $ZrO_2$ and $SnO_2$, respectively with $In_2O_3$ were applied, respectively in the second dielectric layer 37 were measured with respect to an RF signal jitter value at the time of 10 times of DOW (DOW10).

The measurement result of the RF signal jitter value of each of the optical information recording media 30 is shown in FIGS. 9A to 9C. FIG. 9A shows the result obtained in the case where a complex oxide of $In_2O_3$ and $Ga_2O_3$ was applied in the second dielectric layer 37. Also, FIG. 9B shows the result obtained in the case where a complex oxide of $In_2O_3$ and $SnO_2$ was applied in the second dielectric layer 37. FIG. 9C shows the result obtained in the case where a complex oxide of $In_2O_3$ and $ZrO_2$ was applied in the second dielectric layer 37.

Also, the optical information recording media 30 in which complex oxides formed by combining $Ga_2O_3$, $ZrO_2$ and $SnO_2$, respectively with $In_2O_3$ were applied, respectively in the second dielectric layer 37 were measured with respect to the DOW number.

The measurement result of the DOW number of each of the optical information recording media 30 is shown in FIGS. 10A to 10C. FIG. 10A shows the result obtained in the case where a complex oxide of $In_2O_3$ and $Ga_2O_3$ was applied in the second dielectric layer 37. Also, FIG. 10B shows the result obtained in the case where a complex oxide of $In_2O_3$ and $SnO_2$ was applied in the second dielectric layer 37. FIG. 10C shows the result obtained in the case where a complex oxide of $In_2O_3$ and $ZrO_2$ was applied in the second dielectric layer 37.

As to the DOW number, a point at which when overwriting is advanced, the jitter value is abruptly deteriorated is measured and defined as a rewriting number of the start point of abrupt deterioration. For example, in the case of the optical information recording medium 30 in which a single substance of $In_2O_3$ is applied in the second dielectric layer 37 shown in FIG. 8, the DOW number is 100.

Also, the optical information recording media 30 in which complex oxides formed by combining $Ga_2O_3$, $ZrO_2$ and $SnO_2$, respectively with $In_2O_3$ were applied, respectively in the second dielectric layer 37 were subjected to a reliability test.

In the reliability test, each of the optical information recording media 30 was held in a thermo-hygrostat in an atmosphere at a temperature of 80° C. and a humidity of 85% for 100 hours, and the defect was then detected using the foregoing disc evaluation apparatus, thereby measuring an increasing rate of defect. The increasing rate of defect is expressed by a numerical value obtained by dividing a number of defective areas per mm² in the optical information recording medium 30 by a time (day) of the reliability test.

The result of the increasing rate of defect of the reliability test of each of the optical information recording media 30 is shown in FIGS. 11A to 11C. FIG. 11A shows the result obtained in the case where a complex oxide of $In_2O_3$ and $Ga_2O_3$ was applied in the second dielectric layer 37. Also, FIG. 11B shows the result obtained in the case where a complex oxide of $In_2O_3$ and $SnO_2$ was applied in the second dielectric layer 37. FIG. 11C shows the result obtained in the case where a complex oxide of $In_2O_3$ and $ZrO_2$ was applied in the second dielectric layer 37.

In FIGS. 9A to 9C, 10A to 10C and 11A to 11C, the abscissa expresses a composition ratio of $Ga_2O_3$, $ZrO_2$ or $SnO_2$ in each of the complex oxides in terms of a molar ratio (% by mole). In FIGS. 11A to 11C, each of the broken lines in the graphs expresses an increasing rate of defect in the case of using a single substance of $In_2O_3$ in the second dielectric layer 37.

It is understood from the measurement result of the DOW number shown in FIGS. 10A to 10C that by applying a complex oxide of $Ga_2O_3$, $ZrO_2$ or $SnO_2$ with $In_2O_3$ in the second dielectric layer 37, an increase of the DOW number of the optical information recording medium 30 can be expected.

In the case of the optical information recording medium 30 in which a single substance of $In_2O_3$ was applied in the second dielectric layer 37, the DOW number was 100. On the contrary, in the optical information recording media 30 in which a complex oxide of $Ga_2O_3$, $ZrO_2$ or $SnO_2$ with $In_2O_3$ was applied in the second dielectric layer 37, a result in which the DOW number is more excellent than that in the case of applying a single substance of $In_2O_3$ was obtained depending upon the composition ratio of $Ga_2O_3$, $ZrO_2$ or $SnO_2$.

Also, in the optical information recording medium 30 in which a complex oxide of $In_2O_3$ and $Ga_2O_3$ was applied in the second dielectric layer 37, as shown in FIG. 10A, the DOW number extended in a region where the composition ratio of $Ga_2O_3$ is 50% by mole or more and not more than 70% by mole. Also, as shown in FIG. 9A, it was understood that the jitter value of DOW10 decreased in a region where the composition ratio is 50% by mole or more and not more than 70% by mole. However, as shown in FIG. 11A, it is understood that the increasing rate of defect was deteriorated in a region where the composition ratio is 40% by mole or more.

From these results, in the case of applying a complex oxide of $In_2O_3$ and $Ga_2O_3$ in the second dielectric layer 37, the increasing rate of defect of the reliability test increases in a composition ratio region where the effects of the DOW number and the jitter value of DOW10 are excellent as compared with the case of using a single substance of $In_2O_3$. For that reason, it is understood that the application of a complex oxide of $In_2O_3$ and $Ga_2O_3$ in the second dielectric layer 37 is not preferable.

Also, in the optical information recording medium 30 in which a complex oxide of $In_2O_3$ and $ZrO_2$ was applied in the second dielectric layer 37, when the composition ratio of $ZrO_2$ was 60% by mole or more, the crystallization of the recording material could not be advanced in a formatting process.

However, as shown in FIG. 10B, an increase of the DOW number could be confirmed in a region where the composition ratio of $ZrO_2$ was lower than 60% by mole and exceeded 10% by mole, especially in a region where the composition ratio of $ZrO_2$ was 20% by mole or more and not more than 50% by mole. Also, the deterioration of the jitter value of DOW10 was not found in a region where the composition ratio of $ZrO_2$ was 20% by mole or more and not more than 50% by mole.

Furthermore, in a region where the composition ratio of $ZrO_2$ exceeded 10% by mole and was not more than 50% by mole, though the increasing rate of defect was slightly deteriorated as compared with that in the case of using a single substance of $In_2O_3$, it was not remarkably deteriorated. In particular, when the composition ratio of $ZrO_2$ was 20% by mole, the increasing rate of defect was not deteriorated, and an increase of the DOW number was found.

Also, in the optical information recording medium 30 in which a complex oxide of $In_2O_3$ and $SnO_2$ was applied in the second dielectric layer 37, as shown in FIG. 10B, an increase of the DOW number could be confirmed in a region where the composition ratio of $SnO_2$ exceeded 40% by mole, especially in a region where the composition ratio of $SnO_2$ was 50% by mole or more and not more than 70% by mole.

Also, as shown in FIG. 11B, the deterioration of the increasing rate of defect was not found in a region where the composition ratio of $SnO_2$ was 50% by mole or more and not more than 70% by mole as compared with the case of using a single substance of $In_2O_3$.

Furthermore, as shown in FIG. 9B, an especially good result was obtained regarding the jitter value of DOW10 in a region where the composition ratio of $SnO_2$ was 50% by mole or more and not more than 60% by mole.

As described previously, with respect to the three points of the increasing rate of defect, the jitter value of DOW10 and the DOW number, the characteristics of the optical information recording medium 30 in which a complex oxide of $In_2O_3$ and $SnO_2$ was applied in the second dielectric layer 37 were excellent. In particular, excellent effects were obtained in a region which the composition ratio of $SnO_2$ exceeded 40% by mole and was not more than 70% by mole.

Also, in the optical information recording medium 30 in which a complex oxide of $In_2O_3$ and $ZrO_2$ was applied in the second dielectric layer 37, when the composition ratio of $ZrO_2$ was 60% by mole or more, the crystallization of the recording material could not be achieved in a formatting process. Also, the optical information recording medium 30 in which a complex oxide of $In_2O_3$ and $SnO_2$ was applied in the second dielectric layer 37 was slightly inferior in view of the characteristics. However, a markedly excellent result was obtained as compared with the optical information recording media 30 in which a complex oxide of $In_2O_3$ and other material than $SnO_2$ was applied in the second dielectric layer 37. In particular, an excellent result was obtained in a region where the composition ratio of $ZrO_2$ exceeded 10% by mole and was not more than 50% by mole. Above all, at a point where the composition ratio of $ZrO_2$ was 20% by mole, the increasing rate of defect was not deteriorated, and the DOW number increased.

As described previously, in a rewritable type optical information recording medium using a phase change of a material for the recording and reproducing principle, a complex oxide of $In_2O_3$ and $SnO_2$ or a complex oxide of $In_2O_3$ and $ZrO_2$ is applied in a dielectric layer coming into contact with a phase-change material layer and intervening between the phase-change material layer and a metal layer. According to this, an optical information recording medium capable of suppressing the growth of a defect to be caused due to a change with a lapse of time without sacrificing recording and reproducing signal characteristics can be prepared.

In the foregoing working example, the experiment was carried out while fixing the materials used in the respective layers other than the second dielectric layer, the phase-change material layer, the metal layer and the like to materials of a single kind, respectively. However, with respect to the composition of each of the layers other than the second dielectric layer, the same effects as those in the working example can be obtained even by using other materials than those described above. Also, in the working example, the optical information recording media in which the information recording layer was constituted of only a single layer were used. However, by forming the information recording layer on the interlayer, the same effects as those in optical information recording media provided with plural information recording layers can be obtained.

In the foregoing embodiments, the optical information media provided with one or three recording layers have been exemplified and described. However, the configuration of the optical information recording medium is not limited thereto, but the present invention is also applicable to an optical information recording medium provided with, for example, two or four recording layers. In particular, the present invention is effectively applicable to an optical information recording medium provided with two or more recording layers and also with a semi-transmitting recording layer.

It should not be construed that the present invention is limited to the configurations described in the foregoing embodiments and working example, but various changes and modifications can be made therein so far as the configuration according to embodiments of the present invention is not deviated.

The present application contains subject matter related to that disclosed in Japanese Priority Patent Application JP 2009-034245 filed in the Japan Patent Office on Feb. 17, 2009, the entire contents of which is hereby incorporated by reference.

What is claimed is:

1. An optical information recording medium comprising:
a supporting substrate;
a light-transmitting protective layer which is a layer on an incident side of recording and reproducing laser light; and
an information recording layer intervening between the supporting substrate and the light-transmitting protective layer, wherein
the information recording layer includes a phase-change material layer, a dielectric layer and a metal layer in this order from the incident side of laser light, the dielectric layer being in direct contact with the metal layer on one side of the dielectric layer, and the dielectric layer being in direct contact with the phase-change material layer on the other side of the dielectric layer, and
the dielectric layer is constituted of, as a main component, $(In_2O_3)_x(SnO_2)_{1-x}$, wherein x is satisfied with the relationship of $(0.4<x\leq 0.7)$.

2. An optical information recording medium comprising:
a supporting substrate;
a light-transmitting protective layer which is a layer on an incident side of recording and reproducing laser light; and
an information recording layer intervening between the supporting substrate and the light-transmitting protective layer, wherein
the information recording layer includes a first dielectric layer, a phase-change material layer, a second dielectric layer, and a metal layer in this order from the incident side of laser light, the first dielectric layer being in direct contact with the light-transmitting protective layer on one side of the first dielectric layer, and the first dielectric layer being in direct contact with the phase-change material layer on the other side of the first dielectric layer, and the second dielectric layer being in direct contact with the metal layer, and
the dielectric layer is constituted of, as a main component, $(In_2O_3)_x(ZrO_2)_{1-x}$, wherein x is satisfied with the relationship of $(0.1<x\leq 0.5)$.

3. An optical information recording medium comprising:
a supporting substrate;
a light-transmitting protective layer which is a layer on an incident side of recording and reproducing laser light; and
plural information recording layers intervening between the supporting substrate and the light-transmitting protective layer, wherein
in the information recording layers, the information recording layer on the incident side of laser light includes a phase-change material layer, a dielectric layer, and a metal layer in this order from the incident side of laser light, the dielectric layer being in direct contact with the metal layer on one side of the dielectric layer, and the dielectric layer being in direct contact with the phase-change material layer on the other side of the dielectric layer, and the dielectric layer is constituted of, as a main component, $(In_2O_3)_x(SnO_2)_{1-x}$, wherein x is satisfied with the relationship of $(0.4 < x \leq 0.7)$.

4. An optical information recording medium comprising:

a supporting substrate;

a light-transmitting protective layer which is a layer on an incident side of recording and reproducing laser light; and plural information recording layers intervening between the supporting substrate and the light-transmitting protective layer, wherein in the information recording layers, the information recording layer on the incident side of laser light includes a phase-change material layer, a dielectric layer, and a metal layer in this order from the incident side of laser light, the first dielectric layer being in direct contact with the light-transmitting protective layer on one side of the first dielectric layer, and the first dielectric layer being in direct contact with the phase-change material layer on the other side of the first dielectric layer, and the second dielectric layer being in direct contact with the metal layer, and the dielectric layer is constituted of, as a main component, $(In_2O_3)_x(ZrO_2)_{1-x}$, wherein x is satisfied with the relationship of $(0.1 < x \leq 0.5)$.

5. The optical information recording medium according to claim 1, wherein the phase-change material layer contains, as a main component, GeSbTe or GeBiTe.

6. The optical information recording medium according to claim 2, wherein the phase-change material layer contains, as a main component, GeSbTe or GeBiTe.

7. The optical information recording medium according to claim 1, wherein the metal layer has a thickness of 8 nm.

8. The optical information recording medium according to claim 2, wherein the metal layer has a thickness of 8 nm.

* * * * *